UNITED STATES PATENT OFFICE.

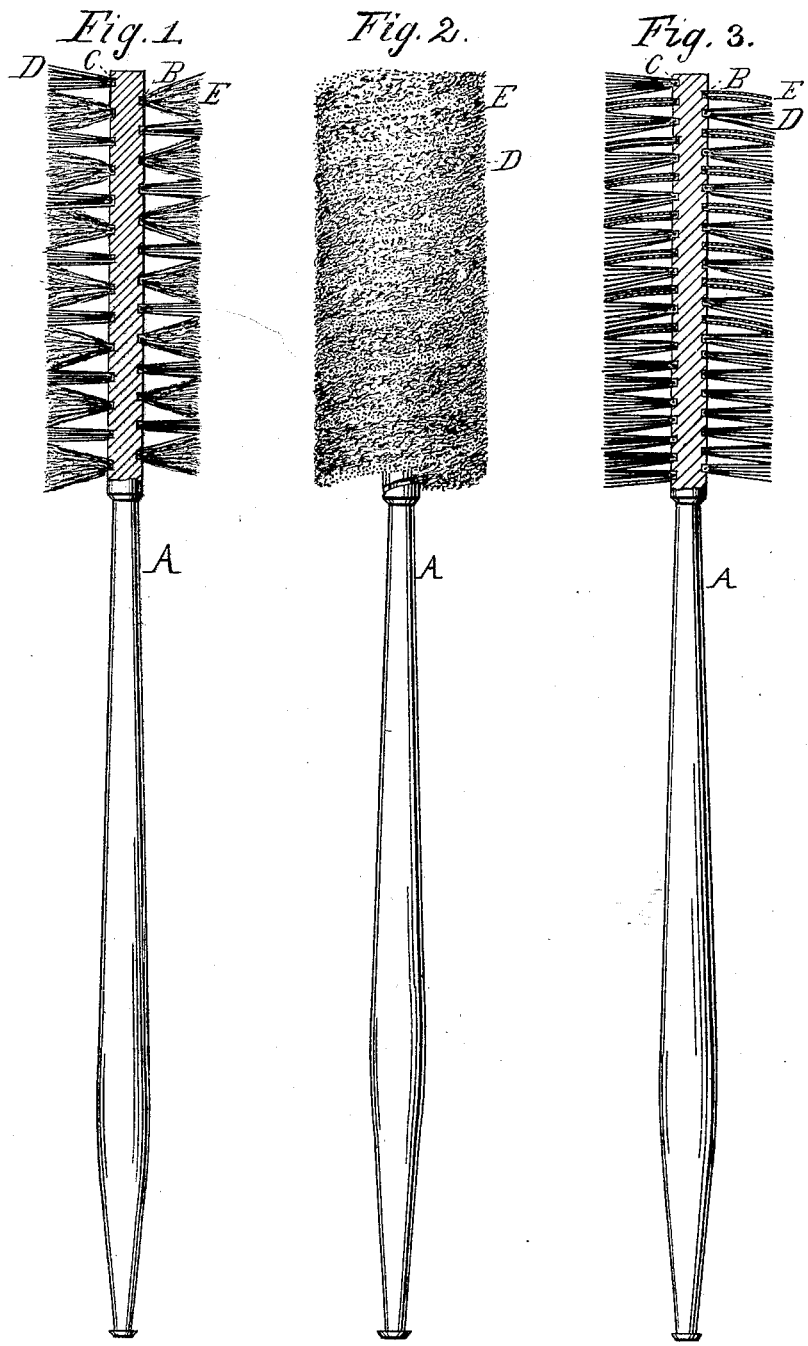

CALVIN B. ROGERS, OF DEEP RIVER, CONNECTICUT.

IMPROVEMENT IN BRUSHES.

Specification forming part of Letters Patent No. 176,197, dated April 18, 1876; application filed January 13, 1876.

*To all whom it may concern:*

Be it known that I, CALVIN B. ROGERS, of Deep River, Middlesex county, Connecticut, have made and invented certain new and useful Improvements in Brushes, of which the following is a specification:

The invention relates to the construction of brushes; and consists in the application of wire, or any other stiff material, and any soft material, such as cotton or woolen yarn or cloth in alternate layers, so as to combine the functions of the bristles or other stiff material with those of the softer material; and, also, in providing an ordinary handle with two spiral parallel grooves, adapted to hold the alternate layers of the two materials, as more fully described and set forth hereinafter.

In the accompanying drawings, Figure 1 is a central vertical section of a device embodying the elements of the invention. Fig. 2 is a plan view of same. Fig. 3 is a central vertical section.

A is an ordinary handle, of any desired construction, provided at one end with the parallel spiral grooves B C, extending a suitable distance, and are of proper size to receive the layers D E. The layer D is composed of any kind of bristles, or wire, or whalebone, or similar material, and the layer E of any soft material that operates to wipe the surface upon which the brush is used.

I prefer to employ for the layer last mentioned a cotton or woolen yarn, but cloth or other similar material may be used, if desired.

In constructing the brush, I apply the layer D in one groove, and the layer E in the other, securing them in place in said grooves by wire, or in any usual manner.

Care should be taken to so adjust the layers or rows of bristles that they will support the layers or rows of soft material, although, as a general rule, there will be no difficulty experienced in this respect, as the stiffer material will almost always hold the other in place.

By preference, the soft material is of different colors, which renders the article attractive, and facilitates its sale.

The operation of the invention will be understood from the description of its parts hereinbefore, and need not be more fully set forth.

Having thus described my invention, what I claim as new, and desire to secure by Letters Patent, is—

1. A brush having at one end a handle, A, and at the other alternate layers of hard and soft material, which layers are arranged transversely to the axial center of the base to which they are attached, forming a cylindrical brush, substantially as specified.

2. A brush-stock provided with two or more parallel spiral grooves, containing alternate rows of hard and soft material, substantially as set forth.

In testimony that I claim the foregoing improvement in brushes, as above described, I have hereunto set my hand and seal this 22d day of December, 1875.

CALVIN B. ROGERS. [L. S.]

Witnesses:
F. L'HOMMEDIEU,
GIDEON PARKER.